United States Patent
Sisk et al.

(10) Patent No.: US 6,366,644 B1
(45) Date of Patent: Apr. 2, 2002

(54) LOOP INTEGRITY TEST DEVICE AND METHOD FOR DIGITAL SUBSCRIBER LINE (XDSL) COMMUNICATION

(75) Inventors: James R. Sisk, Cedar Park; John F. McHale, Austin, both of TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 08/929,778

(22) Filed: Sep. 15, 1997

(51) Int. Cl.[7] .................................................. H04M 1/24
(52) U.S. Cl. ................ 379/1.04; 379/27.01; 379/27.03; 379/1.01; 379/29.01
(58) Field of Search ................................ 379/5, 26, 27, 379/28, 29, 22–24, 18, 12, 10, 9, 6, 1, 1.01, 1.04, 22.02, 22.03, 22.04, 27.01, 27.03, 30; 370/247, 248, 249

(56) References Cited

U.S. PATENT DOCUMENTS

| | | | |
|---|---|---|---|
| 3,532,827 A | 10/1970 | Ewin ............................ 179/18 |
| 3,821,484 A | 6/1974 | Sternung et al. ......... 179/18 EB |
| 4,002,849 A | 1/1977 | Kotler et al. ............ 179/18 EB |
| 4,282,408 A | 8/1981 | Sauers .................... 179/18 FA |
| 4,438,511 A | 3/1984 | Baran ........................... 370/19 |
| 4,665,514 A | 5/1987 | Ching et al. .................. 370/60 |
| 4,679,227 A | 7/1987 | Hughes-Hartogs ........... 379/98 |
| 4,731,816 A | 3/1988 | Hughes-Hartogs ........... 379/98 |
| 4,757,495 A | 7/1988 | Decker et al. ................. 370/76 |
| 4,782,512 A | 11/1988 | Hutton ......................... 379/98 |
| 4,833,706 A | 5/1989 | Hughes-Hartogs ........... 379/98 |
| 4,841,561 A | 6/1989 | Hill .............................. 379/97 |
| 4,949,355 A | 8/1990 | Dyke et al. .................... 375/10 |
| 4,980,897 A | 12/1990 | Decker et al. ................. 375/38 |
| 4,985,889 A | 1/1991 | Frankish et al. ............ 370/94.1 |
| 5,025,469 A | 6/1991 | Bingham ...................... 379/98 |
| 5,054,034 A | 10/1991 | Hughes-Hartogs ............. 375/8 |
| 5,066,139 A * | 11/1991 | Soderberg et al. .............. 379/5 |
| 5,111,497 A * | 5/1992 | Bliven et al. ................. 379/27 |
| 5,119,402 A | 6/1992 | Ginzburg et al. ............. 375/17 |

(List continued on next page.)

FOREIGN PATENT DOCUMENTS

| | | | |
|---|---|---|---|
| JP | 62084646 | 4/1987 | ............ H04M/3/30 |
| JP | 62222755 | 9/1987 | ............ H04M/3/30 |
| JP | 02271763 | 11/1990 | ............ H04M/3/30 |
| JP | 04100367 | 4/1992 | ............ H04M/3/30 |
| WO | 8602796 | 5/1986 | ............ H04M/3/30 |
| WO | WO 97/37458 | 10/1997 | |

OTHER PUBLICATIONS

Horst Hessenmüller, et al., Zugangsnetzstrukturen für interaktive Videodienste (Teil 1), *Fernmelde Ingenieur, Der*, vol. 48, No. 8, XP000647017, Aug., 1994, Germany, pp. 1–32 (with English translation).

Horst Hessenmüller, et al., Zugangsnetzstrukturen für interaktive Videodienste (Teil 2), *Fernmelde–Ingenieur*, vol. 48, No. 9, XP000619688, Sep., 1994, Germany, pp. 1–28 (with English translation).

*Primary Examiner*—Curtis Kuntz
*Assistant Examiner*—Rexford N Barnie
(74) *Attorney, Agent, or Firm*—Baker Botts L.L.P.

(57) ABSTRACT

A digital subscriber line (xDSL) communication system (10) is disclosed that allows xDSL communication across a local loop. The system (10) includes a local loop termination point (14) and customer premises equipment (12) connected to a twisted pair telephone line (16). Loop integrity test devices (22, 24) for xDSL communication are located at the local loop termination point (14) and the customer premises equipment (12) and are coupled to the telephone line (16). The loop integrity test devices (22, 24) are respectively operable to transmit test signatures across the telephone line (16), to receive and evaluate test signatures from the telephone line (16), and to indicate whether the telephone line (16) can support xDSL communication based upon evaluation of test signatures.

12 Claims, 1 Drawing Sheet

U.S. PATENT DOCUMENTS

| | | | |
|---|---|---|---|
| 5,119,403 A | 6/1992 | Krishnan | 375/39 |
| 5,128,619 A * | 7/1992 | Bjork et al. | 379/6 |
| 5,134,611 A | 7/1992 | Steinka et al. | 370/79 |
| 5,185,763 A | 2/1993 | Krishnan | 375/39 |
| 5,198,818 A | 3/1993 | Samueli et al. | 341/144 |
| 5,199,071 A | 3/1993 | Abe et al. | 379/98 |
| 5,202,884 A | 4/1993 | Close et al. | 370/94.1 |
| 5,206,886 A | 4/1993 | Bingham | 375/97 |
| 5,210,530 A | 5/1993 | Kammerer et al. | 340/825.08 |
| 5,214,650 A | 5/1993 | Renner et al. | 370/110.1 |
| 5,222,077 A | 6/1993 | Krishnan | 375/39 |
| 5,228,062 A | 7/1993 | Bingham | 375/97 |
| 5,247,347 A | 9/1993 | Litteral et al. | 358/85 |
| 5,282,155 A | 1/1994 | Jones | 364/724.19 |
| 5,285,474 A | 2/1994 | Chow et al. | 375/13 |
| 5,293,402 A | 3/1994 | Crespo et al. | 375/14 |
| 5,295,159 A | 3/1994 | Kerpez | 375/38 |
| 5,331,670 A | 7/1994 | Sorbara et al. | 375/111 |
| 5,337,348 A | 8/1994 | Yamazaki et al. | 379/94 |
| 5,339,355 A | 8/1994 | Mori et al. | 379/94 |
| 5,341,474 A | 8/1994 | Gelman et al. | 395/200 |
| 5,345,437 A | 9/1994 | Ogawa | 370/13 |
| 5,367,540 A | 11/1994 | Kakuishi et al. | 375/103 |
| 5,371,532 A | 12/1994 | Gelman et al. | 348/7 |
| 5,379,441 A | 1/1995 | Watanabe et al. | 395/800 |
| 5,390,239 A | 2/1995 | Morris et al. | 379/93 |
| 5,400,322 A | 3/1995 | Hunt et al. | 370/19 |
| 5,404,388 A | 4/1995 | Eu | 379/24 |
| 5,408,260 A | 4/1995 | Arnon | 348/6 |
| 5,408,522 A | 4/1995 | Ikehata et al. | 379/98 |
| 5,408,527 A | 4/1995 | Tsutsu | 379/211 |
| 5,408,614 A | 4/1995 | Thornton et al. | 395/275 |
| 5,410,264 A | 4/1995 | Lechleider | 327/311 |
| 5,410,343 A | 4/1995 | Coddington et al. | 348/7 |
| 5,412,660 A | 5/1995 | Chen et al. | 370/110.1 |
| 5,414,455 A | 5/1995 | Hooper et al. | 348/7 |
| 5,414,733 A | 5/1995 | Turner | 375/233 |
| 5,422,876 A | 6/1995 | Turudic | 370/15 |
| 5,428,608 A | 6/1995 | Freeman et al. | 370/60.1 |
| 5,430,793 A | 7/1995 | Ueltzen et al. | 379/98 |
| 5,434,863 A | 7/1995 | Onishi et al. | 370/85.13 |
| 5,440,335 A | 8/1995 | Beveridge | 348/13 |
| 5,442,390 A | 8/1995 | Hooper et al. | 348/7 |
| 5,444,703 A | 8/1995 | Gagliardi et al. | 370/60.1 |
| 5,452,306 A | 9/1995 | Turudic et al. | 370/110.1 |
| 5,453,779 A | 9/1995 | Dan et al. | 348/7 |
| 5,461,415 A | 10/1995 | Wolf et al. | 348/7 |
| 5,461,616 A | 10/1995 | Suzuki | 370/79 |
| 5,461,624 A | 10/1995 | Mazzola | 370/85.13 |
| 5,461,640 A | 10/1995 | Gatherer | 375/231 |
| 5,469,495 A | 11/1995 | Beveridge | 379/56 |
| 5,473,599 A | 12/1995 | Li et al. | 370/16 |
| 5,475,735 A | 12/1995 | Williams et al. | 379/59 |
| 5,477,263 A | 12/1995 | O'Callaghan et al. | 348/7 |
| 5,479,447 A | 12/1995 | Chow et al. | 375/260 |
| 5,495,483 A | 2/1996 | Grube et al. | 370/95.1 |
| 5,504,736 A | 4/1996 | Cubbison, Jr. | 370/13 |
| 5,504,753 A | 4/1996 | Renger et al. | 371/20.1 |
| 5,506,868 A | 4/1996 | Cox et al. | 375/222 |
| 5,513,251 A | 4/1996 | Rochkind et al. | 379/93 |
| 5,517,488 A | 5/1996 | Miyazaki et al. | 370/16 |
| 5,528,585 A | 6/1996 | Cooley et al. | 370/56 |
| 5,528,661 A * | 6/1996 | Siu et al. | 379/27 |
| 5,546,379 A | 8/1996 | Thaweethai et al. | 370/17 |
| 5,553,059 A * | 9/1996 | Emerson et al. | 379/28 |
| 5,555,244 A | 9/1996 | Gupta et al. | 370/60.1 |
| 5,574,724 A | 11/1996 | Bales et al. | 370/68.1 |
| 5,579,369 A * | 11/1996 | Feiner et al. | 379/22 |
| 5,583,862 A | 12/1996 | Callon | 370/397 |
| 5,583,872 A | 12/1996 | Albrecht et al. | 370/476 |
| 5,598,406 A | 1/1997 | Albrecht et al. | 370/296 |
| 5,600,712 A | 2/1997 | Hanson et al. | 379/142 |
| 5,602,902 A | 2/1997 | Satterlund et al. | 379/59 |
| 5,604,741 A | 2/1997 | Samueli et al. | 370/402 |
| 5,612,957 A | 3/1997 | Gregerson et al. | 370/401 |
| 5,631,897 A | 5/1997 | Pacheco et al. | 370/237 |
| 5,636,260 A * | 6/1997 | Chopping | 379/5 |
| 5,649,001 A | 7/1997 | Thomas et al. | 379/93.07 |
| 5,668,857 A | 9/1997 | McHale | 379/93.07 |
| 5,678,004 A | 10/1997 | Thaweethai | 595/187.01 |
| 5,687,176 A | 11/1997 | Wisniewski et al. | 370/476 |
| 5,737,364 A | 4/1998 | Cohen et al. | 375/220 |
| 5,756,280 A | 5/1998 | Soora et al. | 455/4.2 |
| 5,770,950 A | 6/1998 | Zurcher et al. | 326/30 |
| 5,781,617 A | 7/1998 | McHale et al. | 379/93.14 |
| 5,799,017 A | 8/1998 | Gupta et al. | 370/419 |
| 5,812,786 A | 9/1998 | Seazholtz et al. | 395/200.63 |
| 5,818,904 A * | 10/1998 | Dean | 379/22 |
| 5,852,655 A | 12/1998 | McHale et al. | 379/93.14 |
| 5,864,602 A * | 1/1999 | Needle | 379/6 |
| 6,002,671 A * | 12/1999 | Kahkoska et al. | 379/27 |
| 6,091,713 A * | 7/2000 | Lechleider et al. | 379/27 |
| 6,278,728 B1 * | 8/2001 | McHale et al. | 377/219 |

* cited by examiner

LOOP INTEGRITY TEST DEVICE AND METHOD FOR DIGITAL SUBSCRIBER LINE (XDSL) COMMUNICATION

TECHNICAL FIELD OF THE INVENTION

This invention relates in general to data communication, and more particularly to a loop integrity test device and method for digital subscriber line (xDSL) communication.

BACKGROUND OF THE INVENTION

Digital subscriber line (xDSL) communication can provide a high bandwidth data path supported by the twisted pair wiring infrastructure of the public switched telephone network (PSTN). xDSL technologies support data service simultaneously with traditional telephone service using a separation technique. Suitable xDSL technologies include asymmetric digital subscriber line (ADSL), rate adaptable digital subscriber line (RADSL), symmetric digital subscriber line (SDSL), high-speed digital subscriber line (HDSL) and very high-speed digital subscriber line (VDSL).

In general, an xDSL communication link is established across the local loop between customer premises equipment (CPE) and the local loop termination point (e.g., central office or remote terminal). The local loop termination point typically has a xDSL access multiplexer (DSLAM) that handles the xDSL link on the network side, and the CPE typically includes one or more xDSL termination units (XTU) that handle the xDSL link on the customer premises side. One architecture for xDSL communication is disclosed in U.S. Pat. No. 5,668,857 Sep. 16, 1997, and entitled "Communication Server Apparatus and Method."

In order to support xDSL communication, the twisted pair line on the local loop between the customer premises and the loop termination point must meet certain physical characteristics. If it does not, an xDSL communication link can not be successfully established. Consequently, it can be desirable to allow the xDSL capability of the local loop to be quickly verified at the same time that xDSL service is installed at the customer premises. Further, it can be desirable to monitor the xDSL capability of the local loop on an ongoing and continuous basis.

SUMMARY OF THE INVENTION

In accordance with the present invention, a loop integrity test device and method for digital subscriber line communication are disclosed that provide advantages over conventional xDSL communication devices and systems.

According to one aspect of the present invention, a digital subscriber line (xDSL) communication system allows xDSL communication across a local loop. The system includes a local loop termination point and customer premises equipment connected to a twisted pair telephone line. Loop integrity test devices for xDSL communication are located at the local loop termination point and the customer premises equipment and are coupled to the telephone line. The loop integrity test devices are respectively operable to transmit test signatures across the telephone line, to receive and evaluate test signatures from the telephone line, and to indicate whether the telephone line can support xDSL communication based upon evaluation of test signatures.

According to another aspect of the present invention, a loop integrity test device is disclosed that includes a line interface unit operable to connect to and interface with a twisted pair telephone line. The test device also includes an output device operable to indicate a pass state and a fail state. Further, the test device includes a control unit having a generation unit and an evaluation unit. The generation unit is operable to transmit a test signature across the telephone line. The evaluation unit is operable to receive and evaluate a test signature to determine whether the telephone line can support xDSL communication. The control unit is then operable to direct the output device to indicate a pass state if the telephone line can support DSL communication and to indicate a fail state if the telephone line can not support xDSL communication.

A technical advantage of the present invention is that the integrity of the local loop can be verified at the time of installation of high speed xDSL data service at a customer premises. In particular, the present loop integrity test device provides an immediate indication of whether the loop can support xDSL communication when it is installed.

Another technical advantage of the present invention is an improvement in the reliability and monitoring of the xDSL communication system. The test devices implement a continuous integrity check of the local loop that allows the telephone company or other service provider to be alerted to a problem on the local loop. This notification may allow the service provider to correct the problem before a degradation of service is noticed by the customer.

Other technical advantages should be readily apparent to one skilled in the art from the following figures, description, and claims.

BRIEF DESCRIPTION OF THE DRAWINGS

For a more complete understanding of the present invention, and for further features and advantages, reference is now made to the following description taken in conjunction with the accompanying drawings, in which.

DETAILED DESCRIPTION OF THE INVENTION

Figure 1:
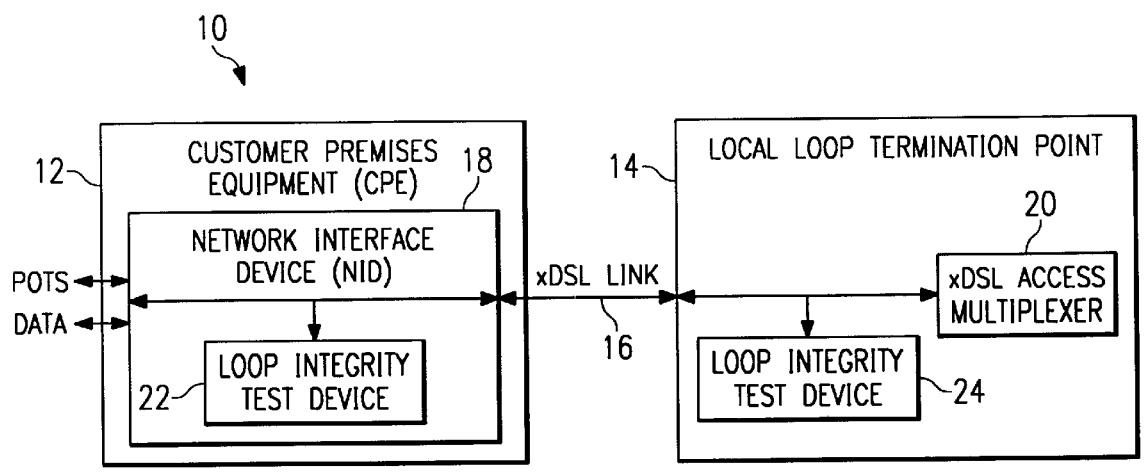
FIG. 1 is a block diagram of one embodiment of an xDSL communication system having loop integrity test devices for xDSL communication according to the present invention.

FIG. 1 is a block diagram of one embodiment of an xDSL communication system, indicated generally at 10, having loop integrity test devices for xDSL communication according to the present invention. System 10 includes customer premises equipment 12 that can be located at any one of a number of customer premises. System 10 also includes a local loop termination point 14 which is connected to customer premises equipment 12 via a twisted pair telephone line 16. Customer premises equipment 12 typically includes a network interface device (NID) 18 which forms a physical interface between the customer premises and the telephone network as well as any other equipment located at the customer premises or other remote loop termination point. Local loop termination point 14 can be a central office, remote terminal or other appropriate termination of the local loop and can include an xDSL access multiplexer (DSLAM) 20 that provides xDSL high bandwidth data service. Telephone line 16 supports conventional voice traffic and is intended to support xDSL communications. However, depending upon physical characteristics of telephone line 16, it may not support xDSL communication or may only support limited xDSL communication. For example, the distance of the local loop, any splices in telephone line 16, loading on telephone line 16 and other physical characteristics affect the integrity of telephone line 16 for xDSL communication.

According to the present invention, a loop integrity test device 22 is located at customer premises equipment 12, and a loop integrity test device 24 is located at local loop termination point 14. Both loop integrity test devices 22 and 24 are coupled to telephone line 16. Loop integrity test devices 22 and 24 respectively operate to transmit test signatures across telephone line 16 and to receive and evaluate a test signature from telephone line 16. The test signature can be a signal with implanted high frequency tones, DC voltages or other distinctive characteristics and can be transmitted periodically at some time interval. For example, the test signature can be pulses, tones, modulated tones, xDSL symbols (e.g., Quadrature Amplitude Modulated (QAM) symbols or Discrete Multitone (DMT) symbols), or other xDSL physical layer symbols chosen to allow determination of the line characteristics and the ability of the line to support xDSL communication. Based upon evaluations of the test signature, loop integrity test devices 22 and 24 indicate whether telephone line 16 can support DSL communication. In this manner, loop integrity test devices 22 and 24 both provide an initial indication of the line integrity upon installation as well as provide an ongoing monitoring of the line integrity.

In one implementation, loop integrity test devices 22 are installed in network interface device (NID) 18 at the customer premises. This is done for ease of installation by a service provider and to avoid interference with other customer premises equipment 12 located behind network interface device (NID) 18. Also, in this implementation, loop integrity device 24 is installed separate from DSL access multiplexer 20 at local loop termination point 14. Similarly, this is done to avoid interference with DSL access multiplexer 20. It should be understood that other implementations are possible within the scope of the present invention. For example, loop integrity device 22 can be implemented as part of other equipment at the customer premises or loop termination point 14 such as part of an xDSL termination unit.

Figure 2:
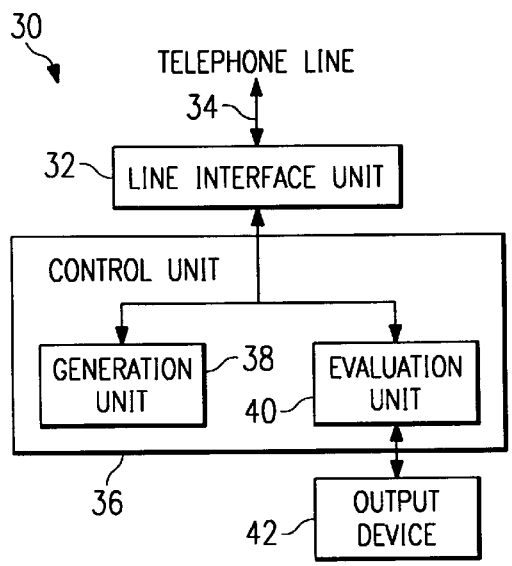
FIG. 2 is a block diagram of one embodiment of a loop integrity test device for xDSL communication according to the present invention.

FIG. 2 is a block diagram of one embodiment of a loop integrity test device, indicated generally at 30, for xDSL communication according to the present invention. As shown, test device 30 can comprise a line interface unit 32 that connects to a telephone line 34. Line interface unit is coupled to a control unit 36 which can comprise a test signature generation unit 38 and a test signature evaluation unit 40. Control device 36 is, in turn, coupled to an output device 42. Output device 42 can, for example, comprise light emitting diode (LED) devices, an LCD display, a speaker, a register, an electronic signal output or a combination of thereof.

In operation, line interface unit 32 provides an interface between control unit 36 and telephone line 34. Control unit 36 manages the operation of test device 30 and directs output device 42. Within control unit 36, generation unit 38 periodically generates and transmits a test signature through line interface unit 32 and across telephone line 34. Generation unit 38 can, for example, generate a test signature by obtaining one from local storage or based upon a generation algorithm. Once generated, the test signature is transmitted to the opposite end point of the local loop. When test device 30 is located at a local loop termination unit, the test signature is transmitted to test devices located at customer premises. Conversely, when test device 30 is located at the customer premises, the test signature is transmitted to the local loop termination equipment. The test signature is designed such that pertinent physical characteristics of telephone line 34 can be determined from analysis of changes to the test signature after it has traveled across telephone line 34. In general, xDSL communication is sensitive in that it uses higher frequencies across the twisted pair cooper lines, thus physical characteristics such as impedance and line length are important to the integrity of telephone line 34.

Evaluation unit 40 receives test signatures transmitted across telephone line 34 and evaluates the test signatures to determine whether telephone line 34 can support some level of xDSL communication. The evaluation can assess such things as loss of energy, change in bit stream pattern, and other changes of the test signature. Based upon analysis of the test signature, evaluation unit 40 identifies whether telephone line 34 can support xDSL communication. Evaluation unit 40 can then direct output device 42 to provide an indication based upon the results of the evaluation. In particular, if telephone line 34 can support xDSL communication, then a pass state can be indicated. If not, then a fail state can be indicated. The indication can, for example, take the form of an audible alarm, a visual display, an electronic message or an electronic signal. In one implementation, output device 52 can provide an electronic flag to software such that automated loop monitoring can be established at the local loop termination point.

Figure 3:
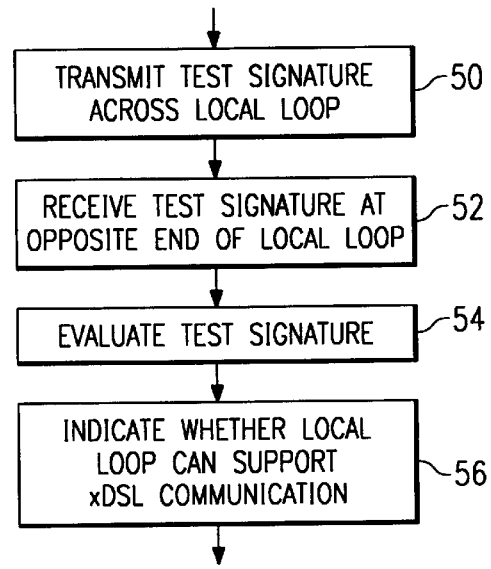
FIG. 3 is a flow chart of a method for local loop integrity testing for xDSL communication according to the present invention.

FIG. 3 is a flow chart of a method for local loop integrity testing for xDSL communication according to the present invention. As shown, in step 50, a test signature is transmitted across the local loop telephone line to be tested. In step 52, the test signature is received at the opposite end of the local loop. The received test signature is then evaluated, in step 54, to determine whether the telephone line can support xDSL communication. This determination is accomplished based upon changes to the test signature caused by transmission across the telephone line. Then, in step 56, an indication is made whether the telephone line can support xDSL communication.

According to the present invention, instant verification of loop integrity for xDSL communication across the local loop can be obtained at install time. This functionality can be accomplished using loop integrity test devices that can be loop powered. Once installed, the test devices can also provide continuous monitoring of the loop (i.e., twenty-four hours a day, seven days a week) and can provide both hardware and software alarms to the customer premises and to the service provider. The test devices are relatively low in cost and provide important qualification of the local loop for spectral compatibility and loop viability for xDSL communication.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A digital subscriber line (xDSL) communication system for xDSL communication across a local loop, comprising:

a local loop termination point connected to a twisted pair telephone line;

customer premises equipment connected to the twisted pair telephone line, the telephone line forming a continuous electrically conductive path without intermediate components between the local loop termination point and the customer premises equipment;

a first loop integrity test device for xDSL communication, the first loop integrity test device located at the loop termination point and coupled to the telephone line, the first loop integrity test device operable to independently initiate a first loop integrity test by transmitting test signatures across the telephone line and to complete a second loop integrity test by receiving and evaluating test signatures transmitted by a second loop integrity test device and indicating whether the telephone line can support xDSL communication based upon evaluation of test signatures received from the second loop integrity test device; and the second loop integrity test device located at the customer premises equipment and coupled to the telephone line, the second loop integrity test device operable to independently initiate the second loop integrity test by transmitting test signatures across the telephone line and to complete the first loop integrity test by receiving and evaluating test signatures transmitted by the first loop integrity test device and indicating whether the telephone line can support xDSL communication based upon evaluation of test signatures received from the first loop integrity test device.

2. The system of claim 1, wherein test signatures transmitted by the first loop integrity test device are the same as the test signatures transmitted by the second loop integrity test device.

3. The system of claim 1, wherein the first loop integrity test device is separate from an xDSL access multiplexer (DSLAM) located at the local loop termination point.

4. The system of claim 1, wherein the second loop integrity test device is located in a network interface device (NID) at a customer premises.

5. The system of claim 1, wherein the second loop integrity test device is located separate from a network interface device (NID) at a customer premises.

6. The system of claim 1, wherein the first and second loop integrity test devices transmit test signatures periodically.

7. The system of claim 1, wherein the first and second loop integrity test devices are further operable to generate the test signatures.

8. The system of claim 1, wherein the first and second loop integrity test devices generate the test signatures using an algorithm.

9. The system of claim 1, wherein the second loop integrity test device indicates whether the telephone line can support xDSL communication using light emitting diode (LED) devices.

10. The system of claim 1, wherein the second loop integrity test device indicates whether the telephone line can support xDSL communication using an audible alarm.

11. The system of claim 1, wherein the first loop integrity test device indicates whether the telephone line can support xDSL communication using an electronic register that can be accessed by software at the local loop termination point.

12. The system of claim 1, wherein the first loop integrity test device indicates whether the telephone line can support xDSL communication using an electronic signal provided to another component at the local loop termination point.

* * * * *